(12) United States Patent
Tu et al.

(10) Patent No.: US 11,716,428 B1
(45) Date of Patent: Aug. 1, 2023

(54) METHOD OF DYNAMICALLY MAPPING SCANNER NAMES FROM CLIENT TO AGENT

(71) Applicant: VMware, Inc., Palo Alto, CA (US)

(72) Inventors: Zhongzheng Tu, Beijing (CN); Weigang Huang, Beijing (CN); Huiyong Huo, Beijing (CN); Mingsheng Zang, Beijing (CN); Yueting Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/897,822

(22) Filed: Aug. 29, 2022

(30) Foreign Application Priority Data

Jul. 18, 2022 (WO) ................ PCT/CN2022/106195

(51) Int. Cl.
*H04N 1/00* (2006.01)
(52) U.S. Cl.
CPC ..... *H04N 1/00344* (2013.01); *H04N 1/00018* (2013.01); *H04N 1/00037* (2013.01); *H04N 1/00079* (2013.01); *H04N 1/00209* (2013.01); *H04N 1/00244* (2013.01); *H04N 1/00411* (2013.01); *H04N 2201/0081* (2013.01)
(58) Field of Classification Search
CPC . H04L 63/02; H04L 63/1408; H04L 63/1491; H04L 65/1053; H04L 65/1069; H04L 65/1079; H04L 67/563; H04L 69/22; H04M 3/436; H04M 3/5183; H04M 3/53308; H04M 7/006; H04M 7/0078; H04N 1/00344; H04N 1/00962; H04N 1/0464; H04N 1/32507; H04N 2201/0039; H04N 2201/0081
USPC .......................................................... 358/1.15
See application file for complete search history.

(56) References Cited

U.S. PATENT DOCUMENTS

| | | | | |
|---|---|---|---|---|
| 9,489,471 | B2 * | 11/2016 | Venkatesh | H04L 67/04 |
| 10,230,855 | B1 * | 3/2019 | Sarreo | H04N 1/0464 |
| 10,536,559 | B2 * | 1/2020 | Vajravel | H04L 67/025 |
| 2012/0167208 | A1 * | 6/2012 | Buford | H04M 7/006 726/22 |
| 2017/0289313 | A1 * | 10/2017 | Vajravel | G06F 13/385 |

(Continued)

OTHER PUBLICATIONS

Dynamsoft "Document Scanner—TWAIN, WIA, ISIS or SANE," Jan. 7, 2020, 8 pages, Retrieved from the Internet Aug. 28, 2022, URL: https://www.dynamsoft.com/blog/insights/document-scanning-twain-wia-isis-sane/.

(Continued)

*Primary Examiner* — Negussie Worku
(74) *Attorney, Agent, or Firm* — Kim & Stewart LLP

(57) ABSTRACT

A scanner redirection method for a remote desktop system that includes a client computing device and a host server includes the steps of: receiving a name of a physical scanner from a scanner core; transmitting the received name of the physical scanner to the host server; and in response to a first user selection to acquire a scanned image and a second user selection of the name of the physical scanner, the first and second user selections being made on a user interface of the host server, receiving from an application running on the host server a request for the scanned image, transmitting to the scanner core a request to acquire the scanned image from the physical scanner, and upon receiving the scanned image from the scanner core, transmitting the scanned image to the application.

20 Claims, 14 Drawing Sheets

(56) References Cited

U.S. PATENT DOCUMENTS

2018/0234517 A1\* 8/2018 Venkatesh ............. H04L 67/563
2021/0141579 A1\* 5/2021 Yuan ....................... G06F 3/121

OTHER PUBLICATIONS

Twain Resource Site—Home Page, 2022, 4 pages, Retrieved from the Internet Aug. 28, 2022, URL: https://twain.org/.

\* cited by examiner

UI 116

Select Scanner Device

⦿ EPSON-DS570W

○ brotherADS-2700W

○ CanonDR-C240

☐ Use vendor-defined name for scanner in remote desktop session

Select Source

| Horizon Virtual Scanner 2.4 | Select |
| | Cancel |

Select Scanner Device

- ◉ EPSON-DS570W
- ○ brotherADS-2700W
- ○ CanonDR-C240

☑ Use vendor-defined name for scanner in remote desktop session

Select Source

EPSON-DS570W

Select

Cancel

Figure 4D

METHOD OF DYNAMICALLY MAPPING SCANNER NAMES FROM CLIENT TO AGENT

CROSS-REFERENCE

This application is based upon and claims the benefit of priority from International Patent Application No. PCT/CN2022/106195, filed on Jul. 18, 2022, the entire contents of which are incorporated herein by reference.

BACKGROUND

Many organizations rely on remote desktop services to provide lean, flexible computing environments. Remote desktop scanning is one important feature required by the end user of a remote desktop service. However, when the source of remote desktop scanning is a client-side scanner, processing of scan commands issued during remote sessions is inefficient and often results in crashes. A robust and efficient method to realize scanner redirection between a client computing device and a host server during a remote session is needed.

SUMMARY

Accordingly, one or more embodiments provide a scanner redirection method for a remote desktop system that includes a client computing device that has running therein remote desktop software including a scanner redirection module, and a host server, the scanner redirection module including a scanner core that is configured to communicate with a physical scanner. According to some embodiments, the scanner core is a "data source." According to other embodiments, the scanner core is an "image capture core." As used herein, "image capture core" is a service running in an operating system of the client computing device that exposes application programming interfaces (APIs) to communicate with one or more connected image capturing devices such as physical scanners, to discover properties of the image capturing devices and to instruct the image capturing devices to perform their native functions and acquire images from the image capturing devices.

The scanner redirection method according to one or more embodiments includes the steps of: transmitting a request to the scanner core for a name of the physical scanner; receiving the name of the physical scanner from the scanner core; transmitting the received name of the physical scanner to the host server, wherein an application running on the host server displays the name of the physical scanner in a remote desktop image generated at the host server and transmitted to the client computing device; and in response to a first user selection to acquire a scanned image and a second user selection of the name of the physical scanner, the first and second user selections being made on a user interface (UI) of the host server, receiving from the application a request for the scanned image, transmitting to the scanner core a request to acquire the scanned image from the physical scanner, and upon receiving the scanned image from the scanner core, transmitting the scanned image to the application.

Further embodiments include a non-transitory computer-readable storage medium comprising instructions that cause a remote desktop system to carry out the above method, as well as a remote desktop system configured to carry out the above method.

BRIEF DESCRIPTION OF THE DRAWINGS

FIG. 4A is a block diagram illustrating an exemplary UI for selecting a physical scanner via remote desktop software of the client computing device.

FIG. 4B is a block diagram illustrating an exemplary UI for selecting a source for a scanned image via an application of the virtual machine without using a vendor-defined name for the physical scanner.

FIG. 4C is a block diagram illustrating an exemplary UI for selecting the physical scanner via the remote desktop software of the client computing device and selecting to use the vendor-defined name of the physical scanner on the application of the virtual machine.

FIG. 4D is a block diagram illustrating an exemplary UI for selecting the source for the scanned image via the application of the virtual machine using the vendor-defined name for the physical scanner.

DETAILED DESCRIPTION

Figure 1:
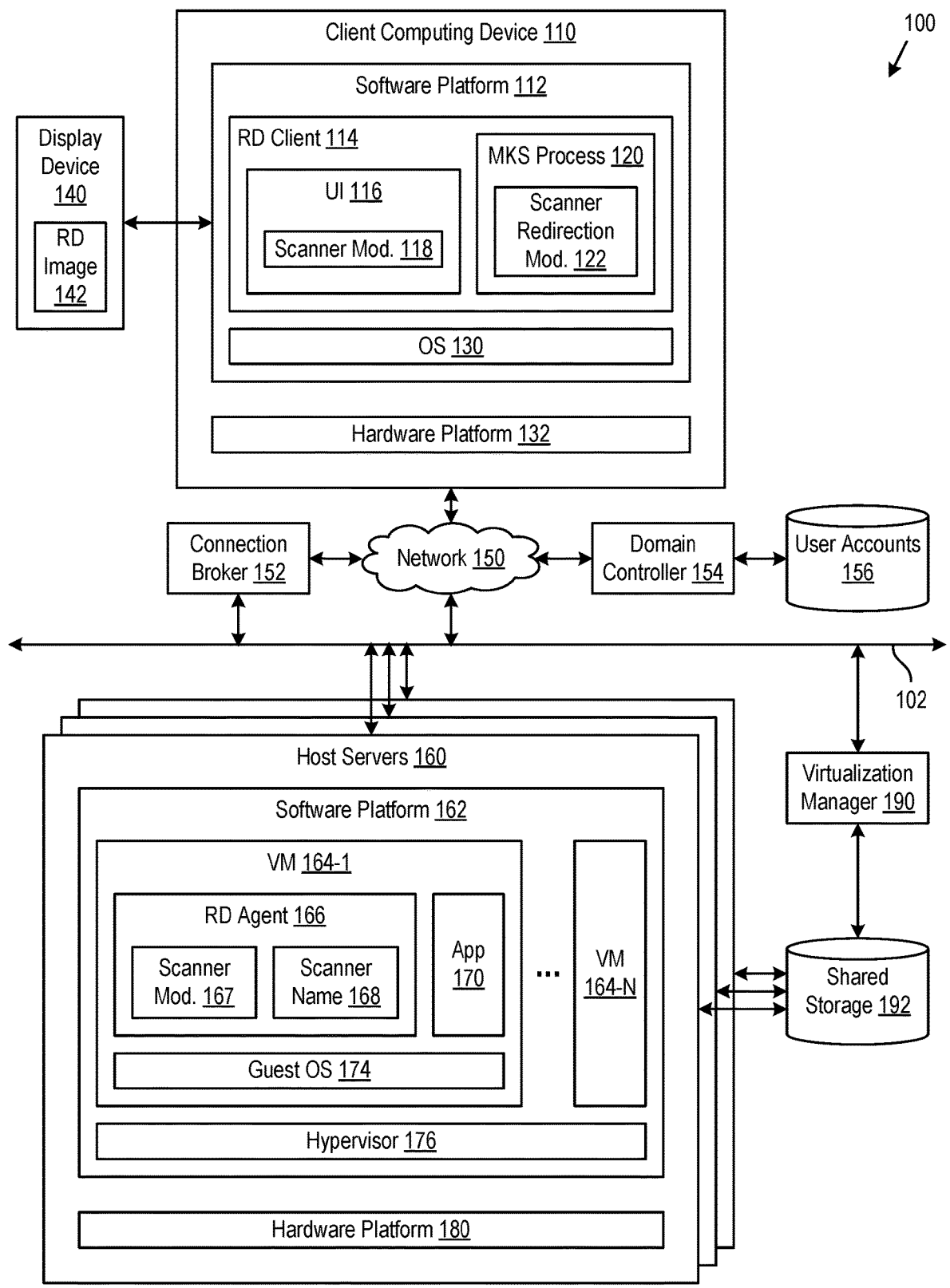
FIG. 1 is a block diagram of a virtualized desktop infrastructure system in which embodiments may be implemented.

Techniques for realizing scanner redirection between a client computing device and a host server during a remote session are described. A guest operating system (OS) in a virtual machine (VM) of the host server executes an application that requires one or more images to be scanned by a physical scanner that is connected to the client computing device. Accordingly, the application in the VM of the host server requests the image(s) from a module of a remote desktop (RD) client application, referred to as a "scanner redirection module." The scanner redirection module acquires the image(s) from the physical scanner and transmits the image(s) to the application in the VM of the host server.

According to a first embodiment, to realize the described scanner redirection, both the scanner redirection module of the RD client application and the application in the VM of the host server utilize a robust scanning protocol such as the TWAIN protocol. Pursuant to the scanning protocol, the scanner redirection module and the application in the VM of the host server each utilize a "data source manager" and a "data source." For the application in the VM of the host server, the data source manager communicates with a "virtual" data source that requests scanned images from the scanner redirection module. For the scanner redirection module, the data source manager communicates with a data source that is configured to communicate with the physical scanner to acquire scanned images for transmitting to the application in the VM of the host server.

According to a second embodiment, the client computing device and host server run different OSs. As a result, to realize the described scanner redirection, the scanner redirection module and the application in the VM of the host server utilize robust but different scanning protocols such as the Image Capture (ICA) framework and the TWAIN protocol. Pursuant to its respective scanning protocol, the application in the VM of the host server utilizes a data source manager and a virtual data source. Like in the first embodiment, the data source manager communicates with the virtual data source, which requests scanned images from the scanner redirection module. Pursuant to the other scanning protocol, the scanner redirection module utilizes an "image capture core" that is configured to communicate with the physical scanner to acquire scanned images for transmitting to the application in the VM of the host server.

According to embodiments, when the user opens an RD session, the RD client application transmits the name of a default physical scanner to an RD agent application to be stored, e.g., in a registry in the VM of the host server. Later, when the user interacts with the application in the VM of the host server, the user selects to acquire a scanned image and is presented with a list of sources to acquire the scanned image from. To make this selection more intuitive, instead of presenting a generic name of the virtual data source of the application in the VM of the host server, the application in the VM of the host server retrieves the name of the physical scanner from the registry and presents the name of the physical scanner to the user, the name of the physical scanner being mapped to the virtual data source.

Accordingly, the user can select the same name via the application in the VM of the host server as the user would select via the RD client application, which is a name defined by the vendor of the physical scanner and is a more intuitive name than the name of the virtual data source. Furthermore, via the RD client application, the user can change the physical scanner from the default physical scanner. If the user changes the physical scanner, the RD client application transmits the name of the selected physical scanner to the RD agent application to be presented to the user by the application in the VM of the host server. These and further aspects of the invention are discussed below with respect to the drawings.

FIG. 1 is a block diagram of a virtualized desktop infrastructure (VDI) system 100 (also referred to as an RD computer system) in which scanner redirection according to embodiments may be implemented. VDI system 100 includes a client computing device 110 and a plurality of host servers 160 that are remote from client computing device 110, e.g., in a remote data center. Client computing device 110 is constructed on a hardware platform 132 such as an x86 architecture platform. Hardware platform 132 includes conventional components (not shown) of a computing device, such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computing device 110 to communicate with host servers 160 over a physical network 150 such as the Internet.

Client computing device 110 includes a software platform 112 on which an RD client software program 114 runs on an OS 130, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse. One of host servers 160 transmits an image 142 of an RD to a mouse, keyboard, screen (MKS) process 120 of RD client 114. RD client 114 then communicates with a display device 140 such as a monitor on which the user views RD image 142.

When the user performs actions in the RD, such as clicking a mouse or typing on a keyboard, the user's actions are transmitted to MKS process 120. MKS process 120 transmits the user's actions to host server 160 to update the user's RD accordingly. MKS process 120 also includes a scanner redirection module 122 that acquires scanned images from one or more physical scanners (not shown) connected to client computing device 110. Scanner redirection module 122 transmits such scanned images to host server 160. Scanner redirection module 122 is discussed further below in conjunction with FIGS. 2 and 3.

RD client 114 includes a user interface (UI) 116 through which the user adjusts various settings for the RD session. UI 116 includes a client scanner module 118 that acquires a vendor-defined name of a default physical scanner from scanner redirection module 122 to transmit to host server 160. Furthermore, to enable the user to select a different physical scanner, client scanner module 118 acquires the name of each physical scanner connected to client computing device 110 for presenting to the user. Client scanner module 118 then transmits an identification of a selected scanner to scanner redirection module 122 and transmits the name of the selected scanner to host server 160, as discussed further below.

VDI system 100 includes a domain controller 154 such as Microsoft Active Directory® that manages user accounts 156 including the user's log-in information for the RD. VDI system 100 also includes a connection broker 152 that manages connections between RD client 114 and a host server running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 180. Hardware platform 180 is, e.g., a server-grade x86 architecture platform including the conventional components of a computing device described above for hardware platform 132. Software platform 162 includes a hypervisor 176, which is a virtualization software layer that supports a VM execution space within which VMs 164 are concurrently instantiated and executed. One example of hypervisor 176 is a VMware ESX® hypervisor, available from VMware, Inc.

Each of host servers 160 is controlled by a virtualization manager 190, and hardware platform 180 of each of host servers 160 is coupled to a shared persistent storage system 192. Virtualization manager 190 logically groups host servers 160 into a cluster to perform cluster-level tasks such as provisioning and managing VMs 164 and migrating VMs 164 from one of host servers 160 to another. Virtualization manager 190 communicates with host servers 160 via a management network (not shown) provisioned from a physical network 102 such as a local area network (LAN) of a remote data center. Virtualization manager 190 may be, e.g., a physical server or one of VMs 164. One example of virtualization manager 190 is VMware vCenter Server,® available from VMware, Inc.

VM 164-1 includes an RD agent software program 166 and an application 170 running on a guest OS 174, which is a commodity OS. RD agent 166 communicates with RD client 114 to establish a session for the user's RD. RD image 142 is generated in VM 164-1 and transmitted by RD agent 166 to RD client 114 via MKS process 120 to be displayed on display device 140. RD agent 166 includes an agent scanner module 167 that receives names of physical scanners from client scanner module 118. Agent scanner module 167 temporarily stores a name of a physical scanner in a registry of the memory of host server 160 as scanner name 168, to be displayed to the user later when the user interacts with application 170. RD client 114 and RD agent 166 are also referred to individually and collectively herein as RD software.

Application 170 requires images to be scanned by the physical scanner(s) connected to client computing device 110. Application 170 has been modified to handle scanner redirection with scanner redirection module 122. In one example, application 170 is Adobe Photoshop, which the user is accessing through the RD session. Application 170 is discussed further below in conjunction with FIGS. 2 and 3. A particular configuration of VDI system 100 is illustrated in FIG. 1, but it should be recognized that one or more embodiments may be practiced with other computer system configurations.

Figure 2:
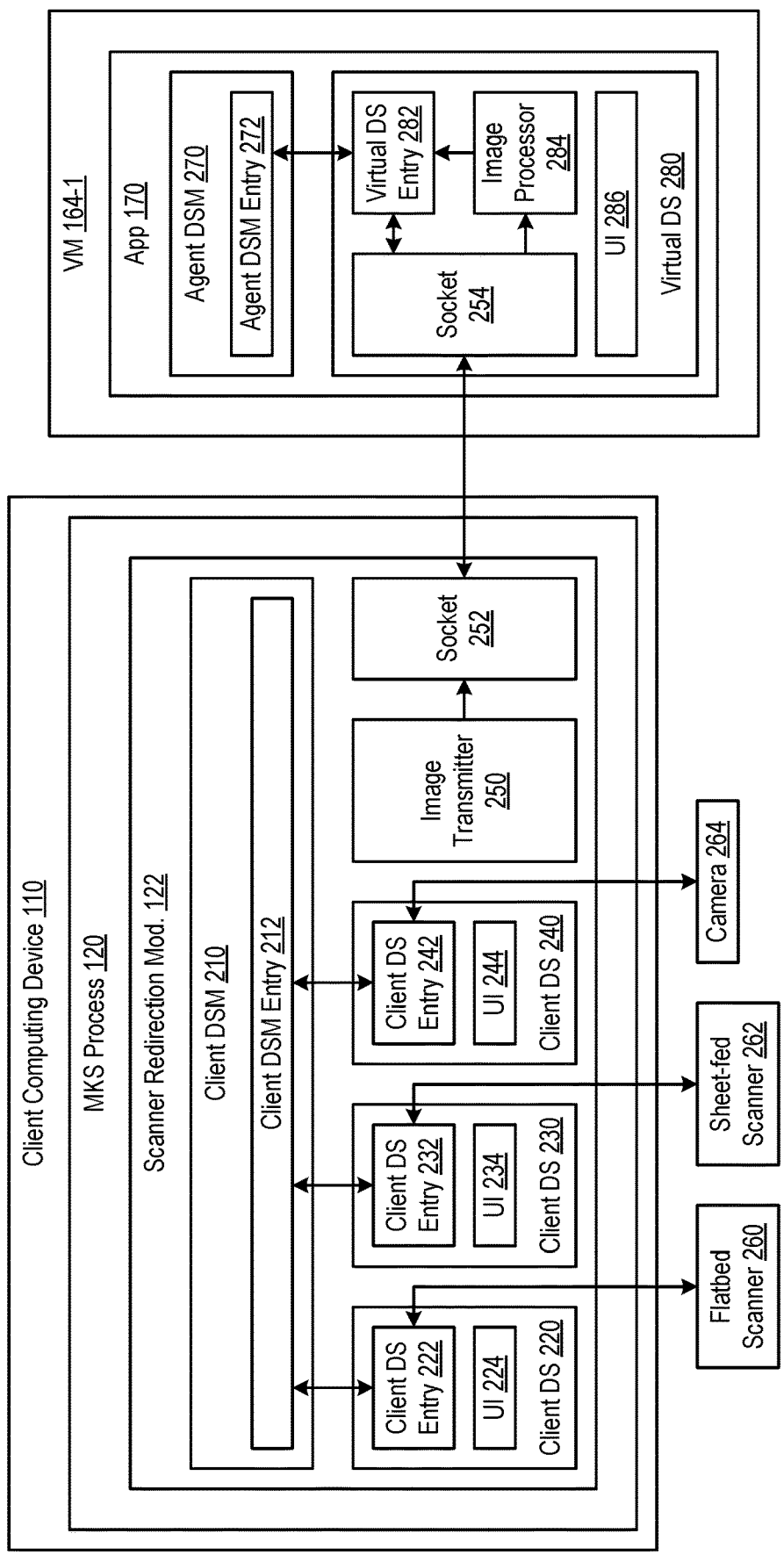
FIG. 2 is a block diagram of a client computing device and a virtual machine running on a host server, of the virtualized desktop infrastructure system, according to a first embodiment.

FIG. 2 is a block diagram illustrating client computing device 110 and VM 164-1 of VDI system 100 according to a first embodiment in which scanner redirection module 122 and application 170 use the same scanning protocol. Client computing device 110 is connected to three physical scanners: a flatbed scanner 260, a sheet-fed scanner 262, and a camera 264. Scanner redirection module 122 of client computing device 110 includes a client data source manager (DSM) 210 that communicates with scanner cores to acquire scanned images. According to the first embodiment, the scanner cores are client data sources (DSs) 220, 230, and 240. Client DSs 220 230, and 240 are configured to communicate with flatbed scanner 260, sheet-fed scanner 262, and camera 264, respectively. Although illustrated as communicating directly with the physical scanners, client DSs 220, 230, and 240 may also communicate with separate drivers in OS 130 to acquire scanned images from the physical scanners.

Communication between scanner redirection module 122 and the physical scanners is carried out via client DSM 210 and the client DSs. Specifically, scanner redirection module 122 calls a "client DSM entry" function 212 to transmit commands to client DSM 210. Client DSM 210 calls "client DS entry" functions 222, 232, and 242 to transmit commands to client DSs 220, 230, and 240, respectively. The client DSs also return results to client DSM 210 via return values of client DS entry calls. Similarly, client DSM 210 provides results via return values of client DSM entry 212 calls.

Client DSs 220, 230, and 240 have UIs 224, 234, and 244 for adjusting scanner properties of physical scanners and beginning the scanning of images. According to embodiments, UIs 224, 234, and 244 can be disabled to instead present a user a UI 286 of application 170, as discussed further below. When one of the client DSs acquires a scanned image from a respective physical scanner, the client DS returns the scanned image to client DSM 210 to be further transmitted to an image transmitter 250. Image transmitter 250 transmits the scanned image to application 170 of VM 164-1 via sockets 252 and 254 of scanner redirection module 122 and application 170, respectively.

Application 170 includes an agent DSM 270 that communicates with a virtual DS 280 to request scanned images. Virtual DS 280 is configured to communicate with scanner redirection module 122 to acquire scanned images from the physical scanners. Application 170 calls an "agent DSM entry" function 272 to transmit commands to agent DSM 270. Agent DSM 270 calls a "virtual DS entry" function 282 to transmit commands to virtual DS 280. Virtual DS 280 also returns results to agent DSM 270 via return values of virtual DS entry 282 calls. Similarly, agent DSM 270 provides results via return values of agent DSM entry 272 calls. Virtual DS 280 has a UI 286 for allowing the user to adjust scanner properties of physical scanners and begin scanning images. Accordingly, the user can perform such actions via UI 286 while UIs 224, 234, and 244 are disabled.

As previously mentioned, application 170 receives scanned images from scanner redirection module 122 via sockets 252 and 254. Specifically, the scanned images are received by an image processor 284 of virtual DS 280 that renders the scanned images, e.g., rotating upside-down images so that they face right-side-up. Image processor 284 returns scanned images to virtual DS 280, which returns the scanned images to agent. DSM 270 to be further returned to application 170.

Figure 3:
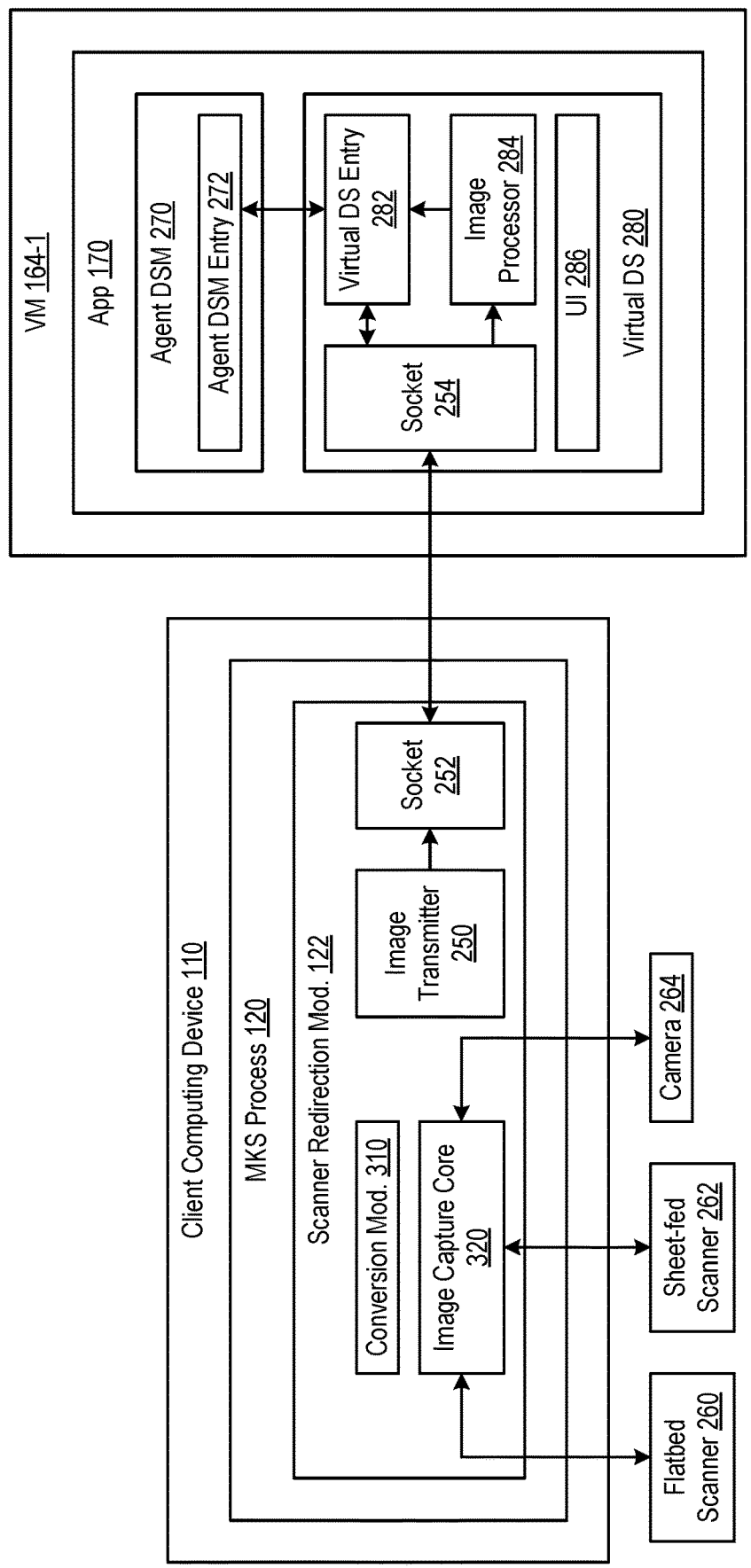
FIG. 3 is a block diagram the client computing device and the virtual machine of the virtualized desktop infrastructure system according to a second embodiment.

FIG. 3 is a block diagram illustrating client computing device 110 and VM 164-1 of VDI system 100 according to a second embodiment in which scanner redirection module 122 and application 170 use different scanning protocols. Like the first embodiment, scanner redirection module 122 of client computing device 110 includes a scanner core that communicates with flatbed scanner 260, sheet-fed scanner 262, and camera 264 to acquire scanned images therefrom. However, according to the second embodiment, the scanner core is an "image capture core 320." Although illustrated as communicating directly with the physical scanners, image capture core 320 may also communicate with separate drivers in OS 130 to acquire scanned images from the physical scanners. After image capture core 320 acquires a scanned image from a physical scanner, scanner redirection module 122 transmits the scanned image to image transmitter 250 to be transmitted to application 170 of VM 164-1 via sockets 252 and 254.

Because scanner redirection module 122 and application 170 use different scanning protocols, scanner redirection module 122 also includes a conversion module 310 that converts data between being described according to the different scanning protocols. For example, if virtual DS 280 requests to view properties of the physical scanners, upon image capture core 320 acquiring the properties, conversion module 310 converts the properties to be described according to the scanning protocol of application 170 before the properties are transmitted to virtual DS 280. Similarly, for example, if virtual DS 280 requests to adjust a property of one of the physical scanners, conversion module 310 converts the desired adjustment to be described according to the scanning protocol of scanner redirection module 122 before the desired adjustment is transmitted to image capture core 320. To perform the communication between scanner redirection module 122 and individual components thereof and between individual components thereof, calls are made via APIs defined by scanner redirection module 122, conversion module 310, image capture core 320, and image transmitter 250.

As with the first embodiment, application 170 includes agent DSM 270, which communicates with virtual DS 280 to request scanned images, and virtual DS 280 is configured to communicate with scanner redirection module 122 to acquire scanned images from the physical scanners. When the user requests scanned images via UI 286, scanned images are received by image processor 284 from scanner redirection module 122 to be returned to virtual DS 280, which returns the scanned images to agent DSM 270 and finally to application 170.

FIG. 4A is a block diagram illustrating an example of UI 116 for selecting a physical scanner via client scanner module 118. In the example of FIG. 4A, the user is presented a list of three scanner devices (physical scanners), each of the physical scanners being identified by a vendor-defined name. The user can select one of the physical scanners by selecting the corresponding radio button. Whichever physical scanner the user selects indicates which physical scanner will be used by scanner redirection module 122 of MKS process 120 when requests are received from application 170, e.g., to acquire scanned images. Here, the user has selected a physical scanner with the vendor-defined name "EPSON-DS570W."

Additionally, UI 116 presents the user with the option to "[u]se vendor-defined name for scanner in remote desktop session." Here, the user has not selected this option, as indicated by the box next to the option being empty. Accordingly, if the user interacts with application 170 and decides to scan an image, the user will be presented with a generic name of virtual DS 280 as a source instead of a vendor-defined name of a physical scanner.

FIG. 4B is a block diagram illustrating an example of a selection window of UI 286 for selecting a source for a scanned image via application 170 of VM 164-1 without using a vendor-defined name for a physical scanner. Here, via UI 286, the user has selected to acquire a scanned image and is presented with a single source for the scanned image: "Horizon Virtual Scanner 2.4." This name corresponds with virtual DS 280, which is unintuitive to a user who would otherwise expect to be presented with a vendor-defined name of a physical scanner. However, if the user selects the data source and clicks the "Select" button, a request will be transmitted by application 170 to scanner redirection module 122, which will acquire an image from the default physical scanner (or the scanner previously selected by the user via client scanner module 118 if applicable).

FIG. 4C is a block diagram illustrating an example of UI 116 for selecting a physical scanner via client scanner module 118 and selecting to use a vendor-defined name of the physical scanner on application 170. As with the example of FIG. 4A, the user is presented a list of three physical scanners, and the user has selected the physical scanner with the vendor-defined name "EPSON-DS570W." However, unlike with the example of FIG. 4A, the user has selected the option to "[u]se vendor-defined name for scanner in remote desktop session." Accordingly, if the user interacts with application 170 and decides to scan an image, the user will be presented with a vendor-defined name like the user was presented with via UI 116.

FIG. 4D is a block diagram illustrating an example of the selection window of UI 286 for selecting a source for a scanned image via application 170 of VM 164-1 using a vendor-defined name for a physical scanner. Here, via UI 286, the user has selected to acquire a scanned image and is presented with a single source for the scanned image: "EPSON-DS570W." This vendor-defined name, which is either the name of the default physical scanner or is a name the user selected via client scanner module 118, is mapped to virtual DS 280. As with the example of FIG. 4B, if the user selects the data source and clicks the "Select" button, a request will be transmitted by application 170 to scanner redirection module 122, which will acquire an image from the physical scanner with the vendor-defined name "EPSON-DS570W."

Figure 5:
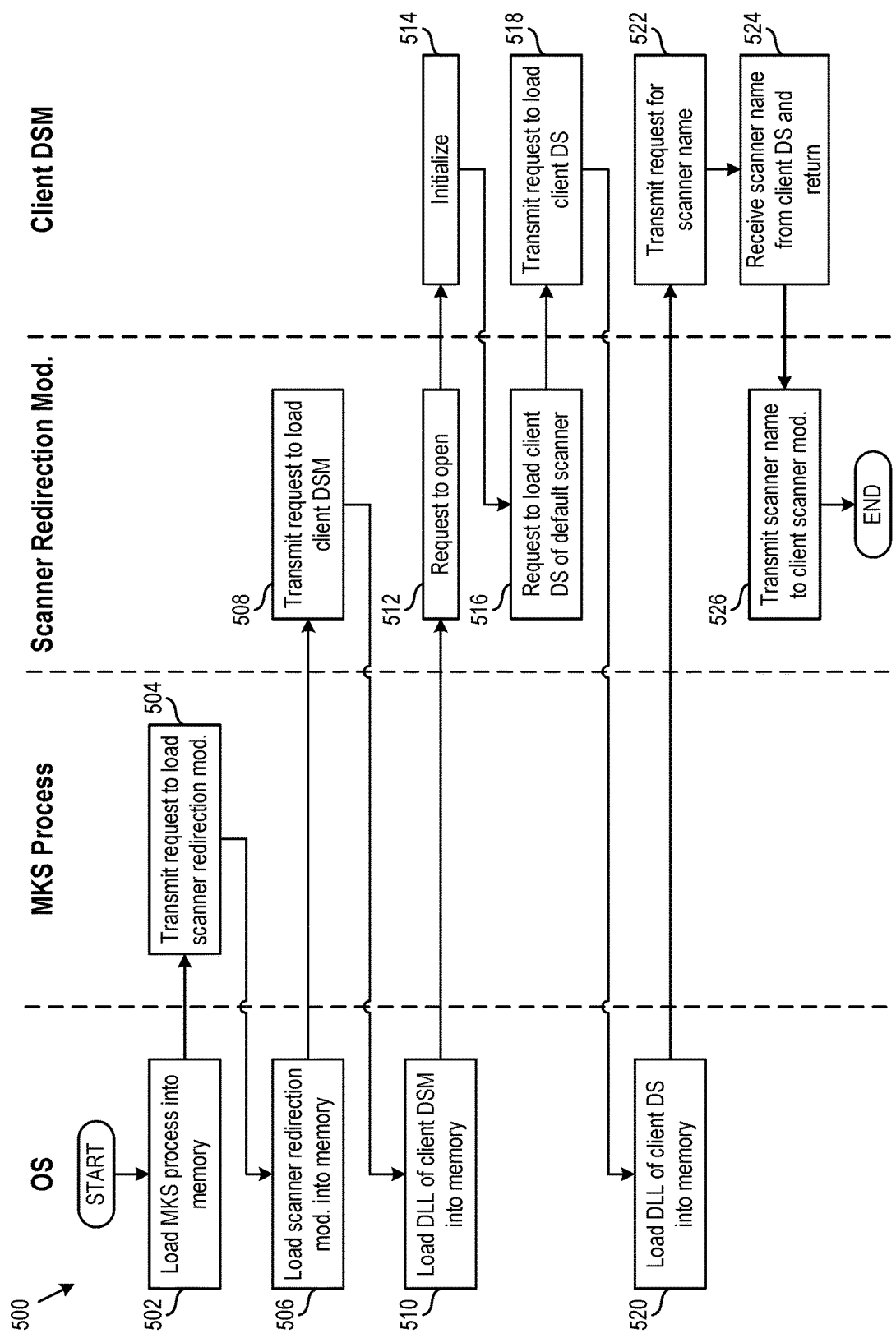
FIG. 5 is a flow diagram of steps performed by an operating system and remote desktop software of the client computing device to carry out a method of acquiring a name of a default physical scanner connected to the client computing device, according to the first embodiment.

FIG. 5 is a flow diagram of steps performed by OS 130 and MKS process 120 of client computing device 110 to carry out a method 500 of acquiring the vendor-defined name of a default physical scanner connected to client computing device 110, according to the first embodiment. At step 502, OS 130 loads MKS process 120 from storage of hardware platform 132 into memory of hardware platform 132. At step 504, MKS process 120 transmits a request to OS 130 to load scanner redirection module 122.

At step 506, OS 130 loads scanner redirection module 122 from storage of hardware platform 132 into memory of hardware platform 132, specifically into the memory space into which MKS process 120 was loaded at step 502. At step 508, scanner redirection module 122 transmits a request to OS 130 to load client DSM 210. At step 510, OS 130 loads a dynamic link library (DLL) of client DSM 210 from storage of hardware platform 132 into memory of hardware platform 132, specifically into the memory space into which scanner redirection module 122 was loaded at step 506. At step 512, scanner redirection module 122 calls client DSM entry 212 to request client DSM 210 to open.

At step 514, client DSM 210 initializes, at which point client DSM 210 is available to assist scanner redirection module 122 in opening client DSs. Client DSM 210 thus transmits a return value of client DSM entry 212 to scanner redirection module 122, indicating that client DSM 210 is open. At step 516, scanner redirection module 122 calls client DSM entry 212 to request client DSM 210 to load a client DS of the default physical scanner, e.g., flatbed scanner 260. At step 518, client DSM 210 transmits a request to OS 130 to load the client DS. At step 520, OS 130 loads a DLL of the client DS from storage of hardware platform 132 into memory of hardware platform 132, specifically into the memory space into which scanner redirection module 122. was loaded at step 506.

At step 522, client DSM 210 calls the client DS entry of the client DS to transmit a request to the client DS for the name of the default physical scanner. The client DS acquires the name from the physical scanner and transmits the name to client DSM 210 as a return value of the client DS entry call. At step 524, client DSM 210 receives the name of the default physical scanner from the client DS and returns the name to scanner redirection module 122. At step 526, scanner redirection module 122 transmits the name to client scanner module 118. After step 526, method 500 ends. After method 500, client scanner module 118 transmits the name of the default physical scanner to agent scanner module 167, and agent scanner module 167 stores the name in the registry of the memory of hardware platform 180 as scanner name 168. The vendor-defined name of the default physical scanner is thus available to application 170 for displaying to the user via UI 286.

Figure 6:
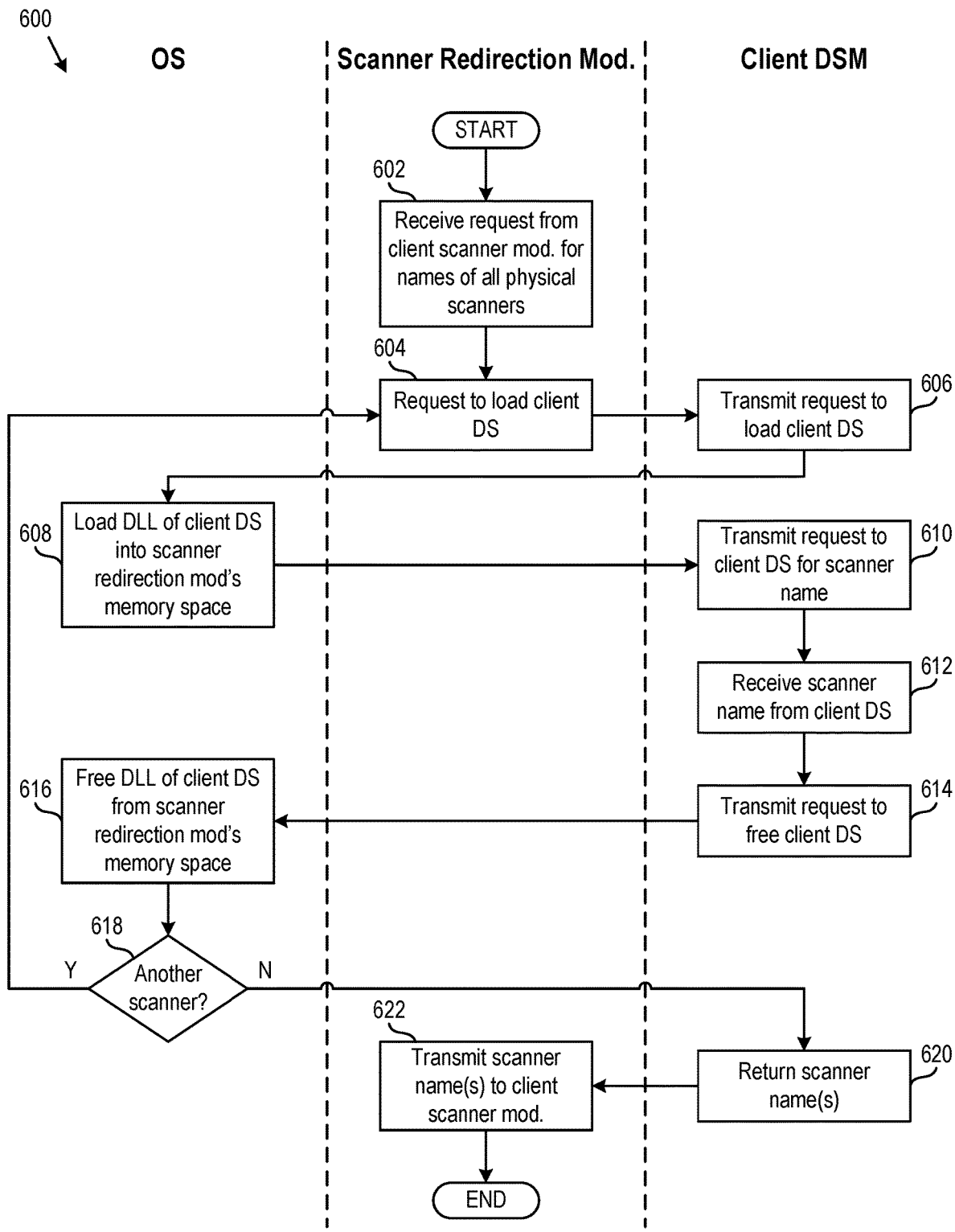
FIG. 6 is a flow diagram of steps performed by the operating system and scanner redirection module of the client computing device to carry out a method of acquiring names of all physical scanners connected to the client computing device, according to the first embodiment.

FIG. 6 is a flow diagrams of steps performed by OS 130 and scanner redirection module 122 of client computing device 110 to carry out a method 600 of acquiring the vendor-defined names of all the physical scanners connected to client computing device 110, according to the first embodiment. Method 600 is triggered by the user selecting to change physical scanners via UI 116. At step 602, scanner redirection module 122 receives a request from client scanner module 118 for names of all the physical scanners. At step 604, scanner redirection module 122 calls client DSM entry 212 to request client DSM 210 to load a client DS, e.g., client DS 220. At step 606, client DSM 210 transmits a request to OS 130 to load the client DS. At step 608, OS 130 loads a DLL of the client DS from storage of hardware platform 132 into memory of hardware platform 132, specifically into the memory space into which scanner redirection module 122 was loaded at step 506 of method 500 of FIG. 5.

At step 610, client DSM 210 calls the client DS entry of the client DS to transmit a request to the client DS for the name of the corresponding physical scanner. The client DS acquires the name from the physical scanner and transmits the name to client DSM 210 as a return value of the client DS entry call. At step 612, client DSM 210 receives the name of the physical scanner from the client DS. At step 614 client DSM 210 transmits a request to OS 130 to free the client DS from the memory of hardware platform 132. At step 616, OS 130 frees the DLL of the client DS from the memory of hardware platform 132.

At step 618, if there is another physical scanner connected to client computing device 110, method 600 returns to step 604, and scanner redirection module 112 requests to load a different client DS that communicates with the other physical scanner, e.g., client DS 230. Otherwise, if there are no more physical scanners connected to client computing device 110 to acquire names from, method 600 moves to step 620. At step 620, client DSM 210 returns any names of physical scanners acquired by client DSM 210 to scanner redirection module 122. At step 622, scanner redirection module 122 transmits the scanner name(s) to client scanner module 118 to be displayed in UI 116, as discussed further below in conjunction with FIG. 10. After step 622, method 600 ends.

Figure 7:
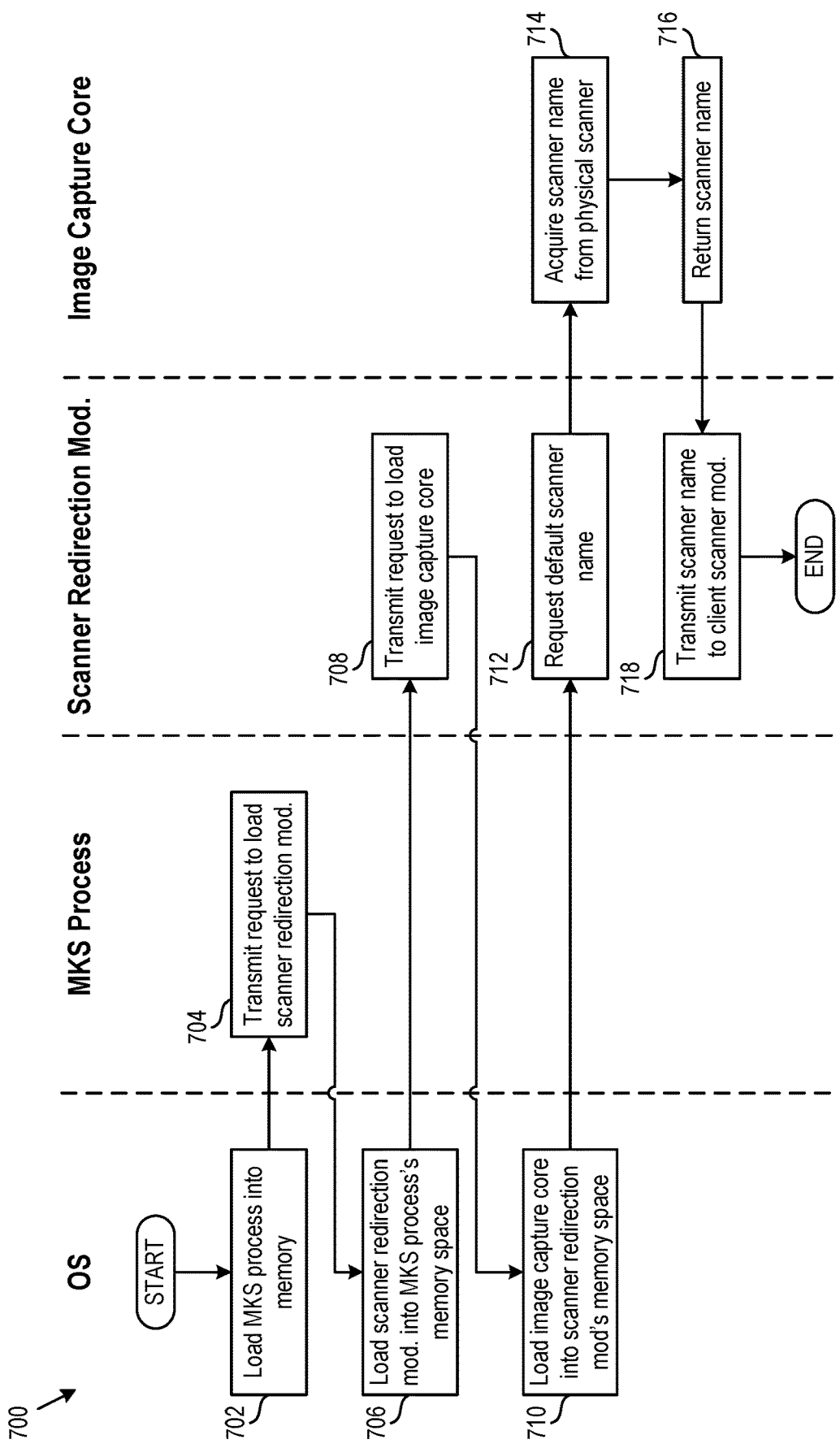
FIG. 7 is a flow diagram of steps performed by the operating system and remote desktop software of the client computing device to carry out a method of acquiring the name of the default physical scanner, according to the second embodiment.

FIG. 7 is a flow diagram of steps performed by OS 130 and MKS process 120 of client computing device 110 to carry out a method 700 of acquiring the vendor-defined name of the default physical scanner, according to the second embodiment. At step 702, OS 130 loads MKS process 120 from storage of hardware platform 132 into memory of hardware platform 132. At step 704, MKS process 120 transmits a request to OS 130 to load scanner redirection module 122. At step 706, OS 130 loads scanner redirection module 122 from storage of hardware platform 132 into memory of hardware platform 132, specifically into the memory space into which MKS process 120 was loaded at step 702. At step 708, scanner redirection module 122 transmits a request to OS 130 to load image capture core 320.

At step 710, OS 130 loads image capture core 320 from storage of hardware platform 132 into memory of hardware platform 132, specifically into the memory space into which scanner redirection module 122 was loaded at step 706. At step 712, scanner redirection module 122 makes an API call to image capture core 320 to request image capture core 320 for the name of the default physical scanner, e.g., flatbed scanner 260. At step 714, image capture core 320 acquires the scanner name from the physical scanner. At step 716, image capture core 320 returns the name of the default physical scanner to scanner redirection module 122. At step 718, scanner redirection module 122 transmits the name to client scanner module 118. After step 718, method 700 ends. After method 700, client scanner module 118 transmits the name of the default physical scanner to agent scanner module 167, and agent scanner module 167 stores the name in the registry of the memory of hardware platform 180 as scanner name 168. The vendor-defined name of the default physical scanner is thus available to application 170 for displaying to the user via UI 286.

Figure 8:
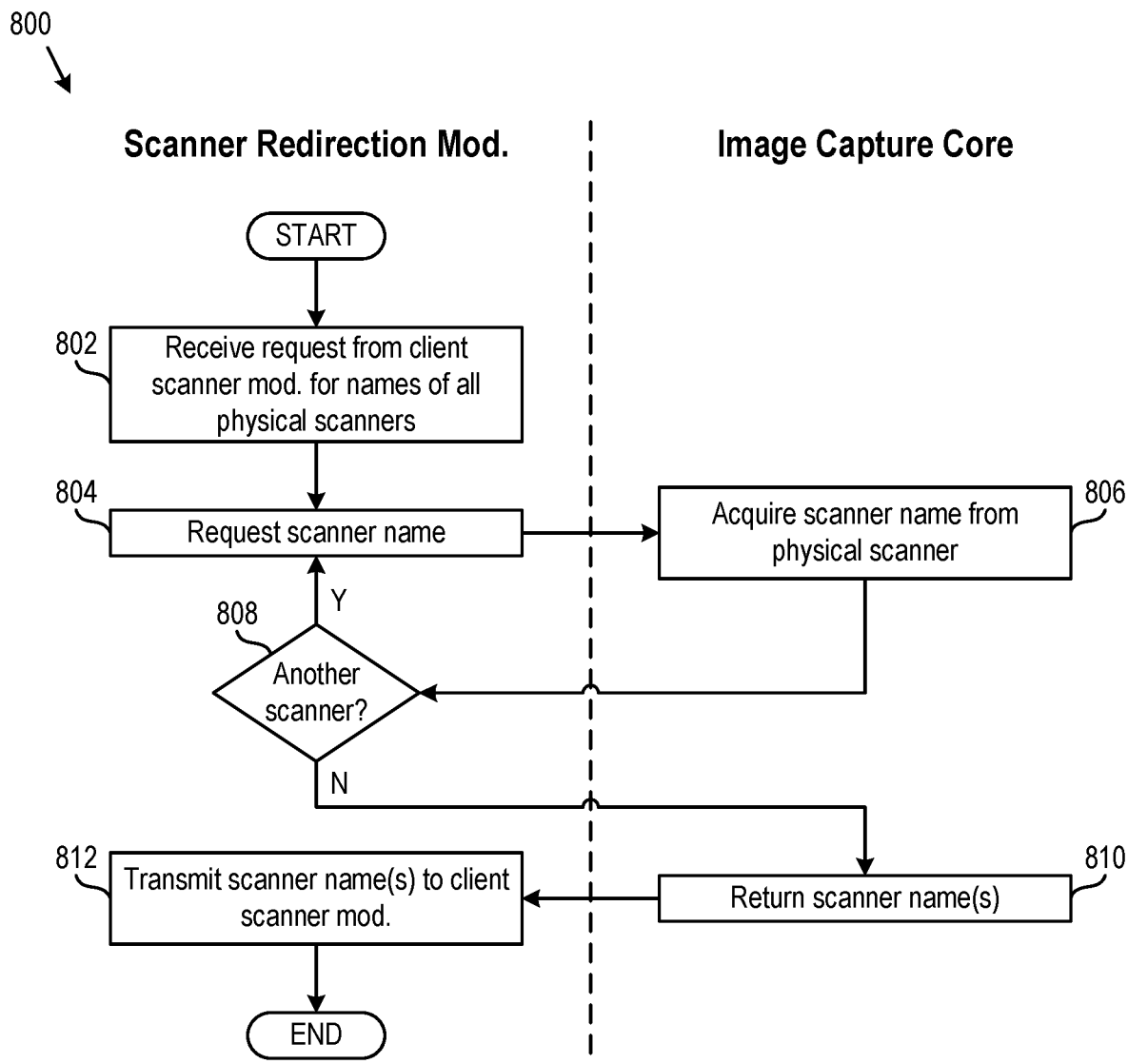
FIG. 8 is a flow diagram of steps performed by the scanner redirection module of the client computing device to carry out a method of acquiring the names of all the physical scanners, according to the second embodiment.

FIG. 8 is a flow diagrams of steps performed by scanner redirection module 122 of client computing device 110 to carry out a method 800 of acquiring the vender-defined names of all the physical scanners connected to client computing device 110, according to the second embodiment. Method 800 is triggered by the user selecting to change physical scanners via UI 116. At step 802, scanner redirection module 122 receives a request from client scanner module 118 for names of all the physical scanners. At step 804, scanner redirection module 122 makes an API call to image capture core 320 to request image capture core 320 to acquire the name of a physical scanner, e.g., of flatbed scanner 260. At step 806, image capture core 320 acquires the scanner name from the physical scanner.

At step 808, if there is another physical scanner connected to client computing device 110 method 800 returns to step 804, and scanner redirection module 112 makes another API call to image capture core 320 to request image capture 320 to acquire the name of the other physical scanner, e.g., of sheet-fed scanner 262. Otherwise, if there are no more physical scanners connected to client computing device 110 to acquire names from, method 800 moves to step 810. At step 810, image capture core 320 returns any names of physical scanners acquired by image capture core 320 to scanner redirection module 122. At step 812, scanner redirection module 122 transmits the scanner name(s) to client scanner module 118 to be displayed in UI 116, as discussed further below in conjunction with FIG. 10. After step 812, method 800 ends.

Figure 9:
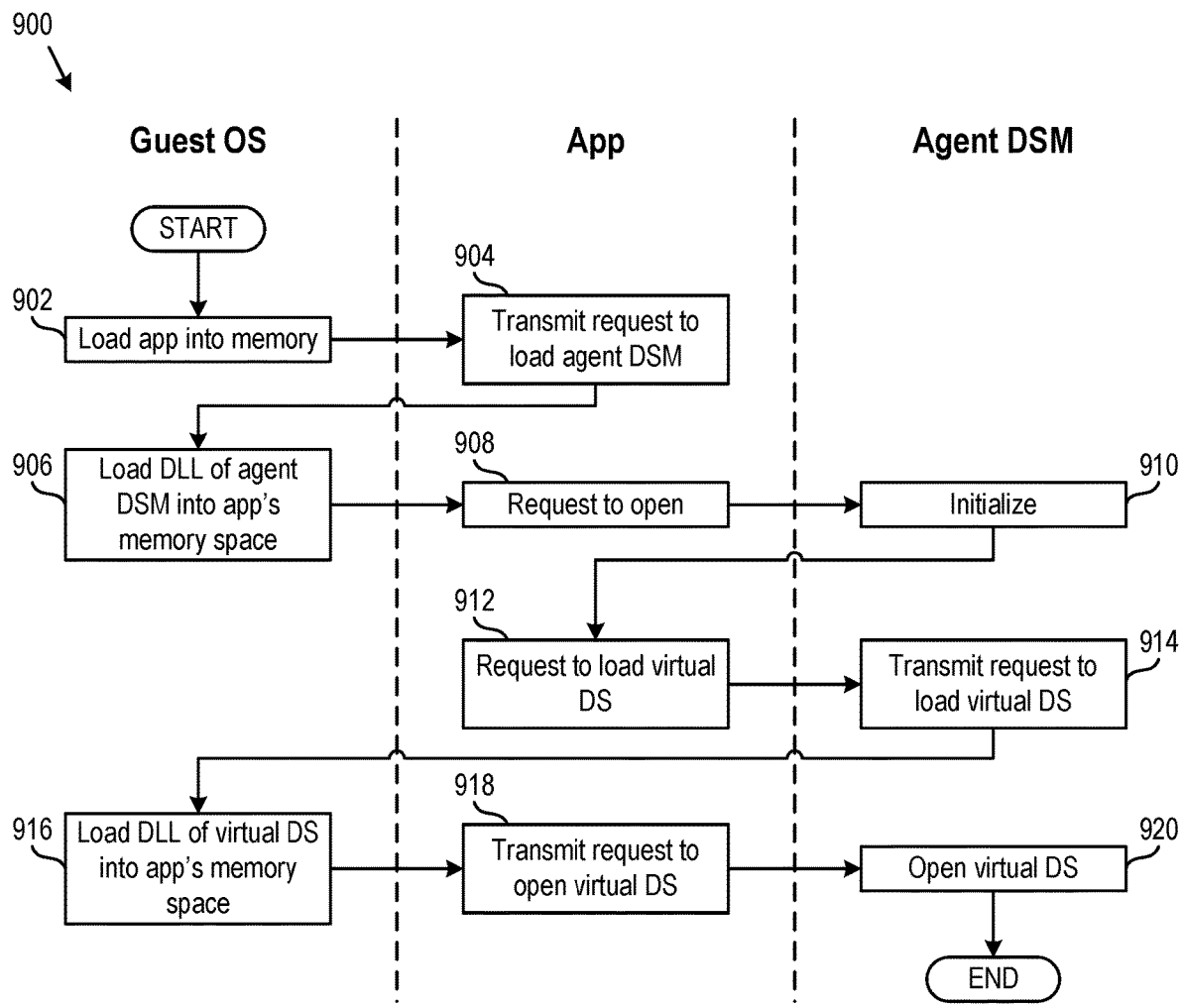
FIG. 9 is a flow diagram of steps performed by a guest operating system and the application of the virtual machine to carry out a method of loading and opening a data source manager and data source of the application, according to embodiments.

FIG. 9 is a flow diagram of steps performed by guest OS 174 and application 170 of VM 164-1 to carry out a method 900 of loading and opening agent DSM 270 and virtual DS 280, according to embodiments. At step 902, guest OS 174 loads application 170 from shared storage 192 into memory of hardware platform 180. At step 904, application 170 transmits a request to guest OS 174 to load agent DSM 270. At step 906, guest OS 174 loads a DLL of agent DSM 270 from shared storage 192 into memory of hardware platform 180, specifically into the memory space into which application 170 was loaded at step 902.

At step 908, application 170 calls agent DSM entry 272 to request agent DSM 270 to open. At step 910, agent DSM 270 initializes, at which point agent DSM 270 is available to assist application 170 in opening virtual DS 280. Agent DSM 270 thus transmits a return value of agent DSM entry 272 to application 170, indicating that agent DSM 270 is open. At step 912, application 170 calls agent DSM entry 272 to request agent DSM 270 to load virtual DS 280. At step 914, agent DSM 270 transmits a request to guest OS 174 to load virtual DS 280.

At step 916, guest OS 174 loads a DLL of virtual DS 280 from shared storage 192 into memory of hardware platform 180, specifically into the memory space into which application 170 was loaded at step 902. At step 918, application 170 calls agent DSM entry 272 to transmit a request to agent DSM 270 to open virtual DS 280, At step 920, agent DSM 270 opens virtual DS 280, at which point virtual DS 280 is available to assist agent DSM 270 in transmitting commands to scanner redirection module 122. After step 920, method 900 ends.

Figure 10:
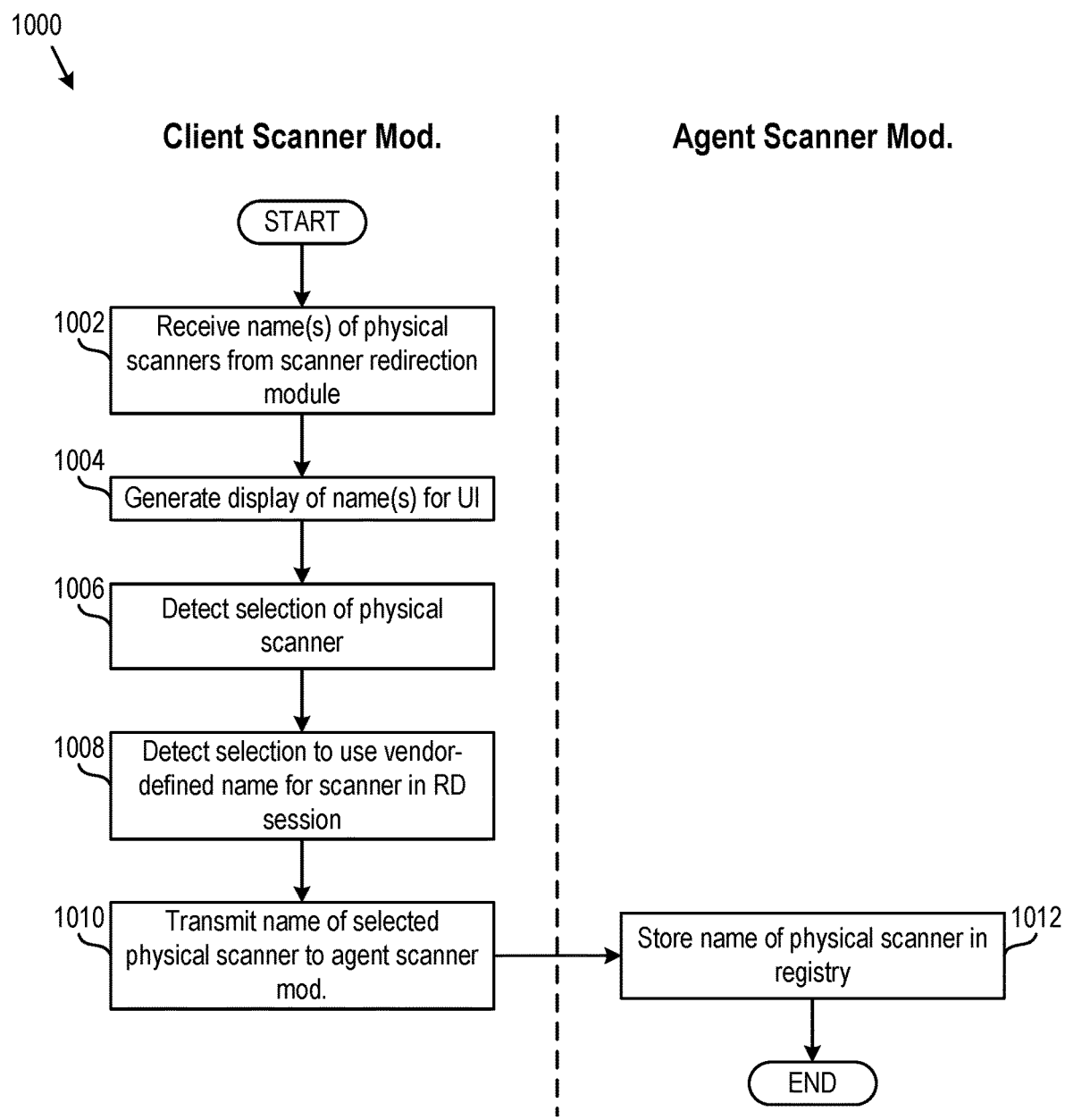
FIG. 10 is a flow diagram of steps performed by remote desktop software of the client computing device and of the host server to carry out a method of transmitting a name of a selected physical scanner from the client computing device to the host server to be stored therein, according to embodiments.

FIG. 10 is a flow diagram of steps performed by client scanner module 118 and agent scanner module 167 to carry out a method 1000 of transmitting a name of a selected physical scanner from client computing device 110 to VM 164-1 to be stored therein, according to embodiments. At step 1002, client scanner module 118 receives one more vendor-defined physical scanner names from scanner redirection module 122. At step 1004, client scanner module 118 generates a display for UI 116, including the name(s) received at step 1002, and display device 140 displays UI 116 to the user.

At step 1006, client scanner module 118 detects a selection of a physical scanner, e.g., upon the user clicking a corresponding radio button with a mouse. At step 1008, client scanner module 118 detects a selection to use the vendor-defined name for the selected physical scanner in the RD session, e.g., upon the user clicking a corresponding box with a mouse. At step 1010, client scanner module 118 transmits the vendor-defined name of the physical scanner to agent scanner module 167. At step 1012, agent scanner module 167 stores the transmitted name in the registry of the memory of hardware platform 180 as scanner name 168. After step 1012, method 1000 ends, and the vendor-defined name of the selected physical scanner is available to application 170 for displaying to the user via UI 286.

Figure 11:
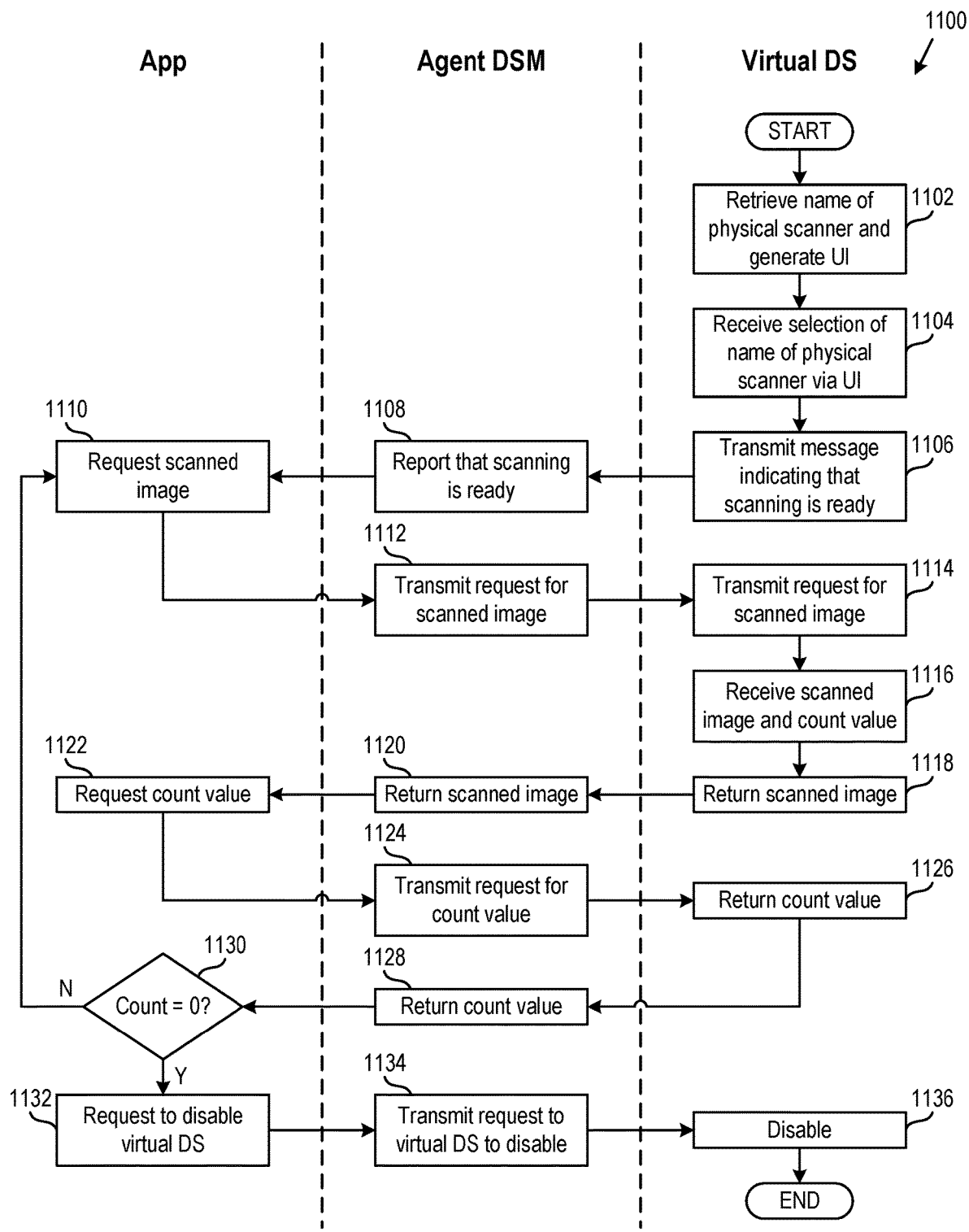
FIG. 11 is a flow diagram of steps performed by the application of the virtual machine to carry out a method of acquiring one or more scanned images from the scanner redirection module of the client computing device, according to embodiments.

FIG. 11 is a flow diagram of steps performed by application 170 of VM 164-1 to carry out a method 1100 of acquiring one or more scanned images from scanner redirection module 122 of client computing device 110, according to embodiments. Method 1100 is triggered by the user selecting to acquire a scanned image via UI 286. At step 1102, virtual DS 280 retrieves scanner name 168 and generates a selection window of UT 286 to display scanner name 168 to the user. Scanner name 168 may be the name of the default physical scanner received upon the user opening the RD session or the name of a physical scanner selected by the user via scanner module 118. Display device 140 displays UI 286 in updated RD image 142, which is transmitted by RD agent 166 to RD client 114 via MKS process 120. At step 1104, virtual DS 280 receives a selection of scanner name 168 via UI 286, e.g., upon the user clicking scanner name 168, which is a vendor-defined name, and clicking a "Select" button.

At step 1106, virtual DS 280 transmits a message to agent DSM 270 indicating that scanning is ready. At step 1108, agent DSM 270 reports to application 170 that scanning is ready. At step 1110, application 170 calls agent DSM entry 272 to request a scanned image from agent DSM 270. At step 1112, agent DSM 270 calls virtual DS entry 282 to transmit a request to virtual DS 280 for the scanned image. At step 1114, virtual DS 280 transmits a request for the scanned image to scanner redirection module 122 via sockets 252 and 254. At step 1116, virtual DS 280 receives the scanned image and a "count" value from scanner redirection module 122 via sockets 252 and 254. Count is a variable indicating whether there are any pending scanned images yet to be retrieved from a physical scanner. A count value of zero indicates that there are no pending scanned images, while a nonzero count value indicates that there is at least one pending scanned image.

At step 1118, virtual DS 280 transmits the scanned image to agent DSM 270 as a return value of the call to virtual DS entry 282 at step 1112. Virtual DS 280 also stores the count value in memory of hardware platform 180 for later. At step 1120, agent DSM 270 returns the scanned image as a return value of the call to agent DSM entry 272 at step 1110. At step 1122, application 170 calls agent DSM entry 272 to request agent DSM 270 for the count value. At step 1124, agent DSM 270 calls virtual DS entry 282 to transmit a request to virtual DS 280 for the count value. At step 1126, virtual DS 280 retrieves the count value from memory and transmits the count value to agent DSM 270 as a return value of the call to virtual DS entry 282 at step 1124. At step 1128, agent DSM 270 reports the count value as a return value of the call to agent DSM entry 272 at step 1122.

At step 1130, application 170 checks if the count value is zero. If the count value is nonzero, method 1100 returns to step 1110, and application 170 calls agent DSM entry 272 to request another scanned image from agent DSM 270. Otherwise, if the count value is zero, method 1100 moves to step 1132. At step 1132, application 170 calls agent DSM entry 272 to request agent DSM 270 to disable virtual DS 280. At step 1134, agent DSM 270 calls virtual DS entry 282 to transmit a request to virtual DS 280 to disable. At step 1136, virtual DS 280 disables itself such that it is no longer available to assist agent DSM 270 in transmitting commands to scanner redirection module 122 via sockets 252 and 254. After step 1136, method 1100 ends.

Figure 12:
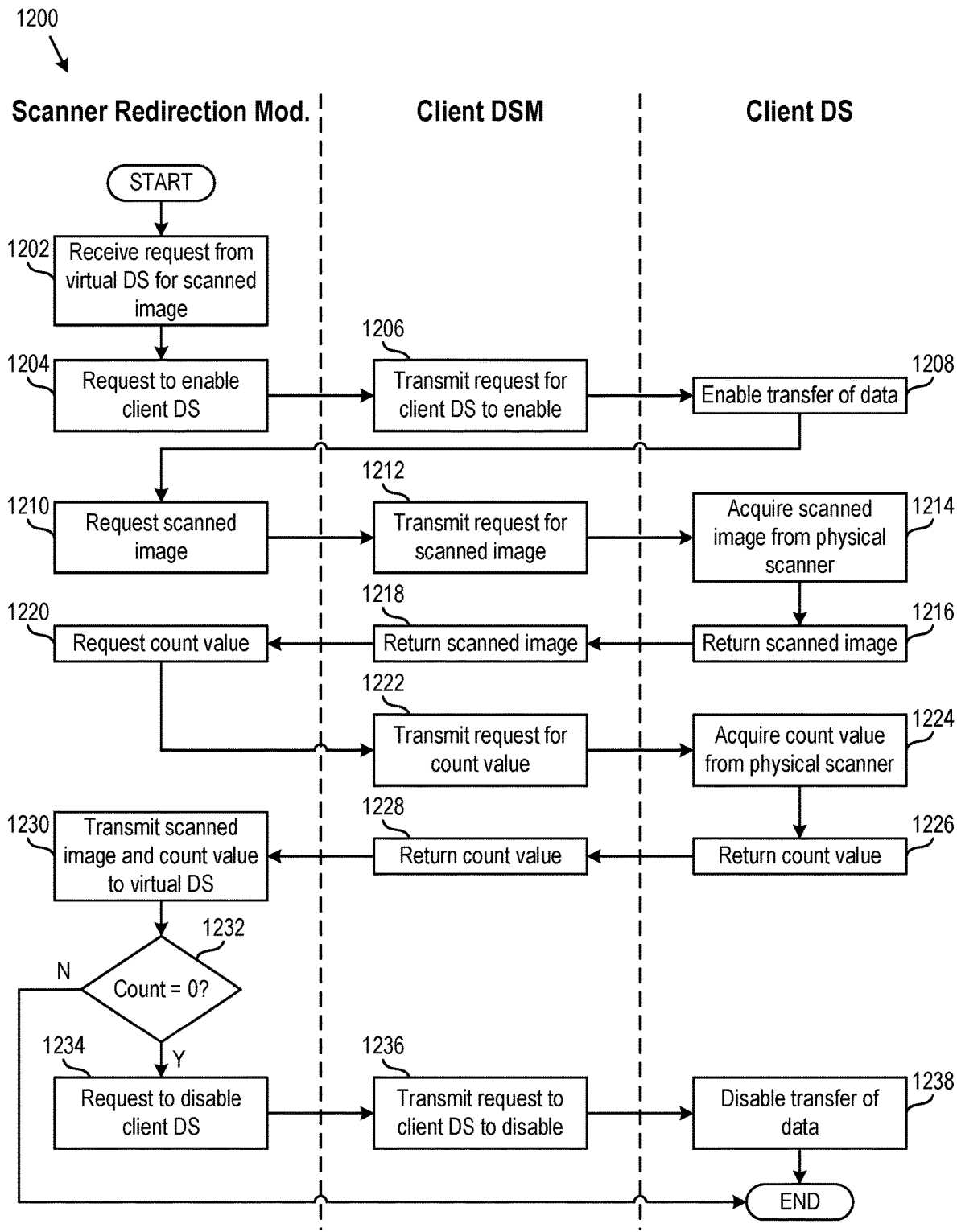
FIG. 12 is a flow diagram of steps performed by the scanner redirection module of the client computing device to carry out a method of acquiring one or more scanned images from a physical scanner, according to the first embodiment.

FIG. 12 is a flow diagram of steps performed by scanner redirection module 122 of client computing device 110 to carry out a method 1200 of acquiring one or more scanned images from a physical scanner, according to the first embodiment. At step 1202, scanner redirection module 122 receives a request for a scanned image from virtual DS 280 via sockets 252 and 254. At step 1204, scanner redirection module 122 calls client DSM entry 212 to request client DSM 210 to enable one of the client DSs of scanner redirection module 122, which corresponds to either the default physical scanner or to a physical scanner the user previously designated via scanner module 118, scanner redirection module 122 having then received an identification of the selected physical scanner from RD client 114. For example, method 1200 will be discussed with reference to client DS 230. It should be noted that client DS 230 must be loaded into memory of hardware platform 132 by OS 130 prior to enabling client DS 230.

At step 1206, client DSM 210 calls client DS entry 232 to transmit a request to client DS 230 to enable. At step 1208, client DS 230 enables the transfer of data from sheet-fed scanner 262. It should be noted that client DS 230 does not show UI 234. The user has already selected to scan an image via UI 286 of virtual 1)8 280. At step 1210, scanner redirection module 122 calls client DSM entry 212 to request client DSM 210 for the scanned image. At step 1212, client DSM 210 calls client DS entry 232 to transmit a request to client DS 230 for the scanned image. At step 1214, client DS 230 acquires the scanned image from sheet-fed scanner 262.

At step 1216, client DS 230 transmits the scanned image to client DSM 210 as a return value of the call to client DS entry 232 at step 1212. At step 1218, client DSM 210 reports the scanned image as a return value of the call to client DSM entry 212 at step 1210. At step 1220, scanner redirection module 122 calls client DSM entry 212 to request client DSM 210 for a count value. At step 1222, client DSM 210 calls client DS entry 232 to transmit a request to client DS 230 for the count value. At step 1224, client DS 230 acquires the count value from sheet-fed scanner 262. At step 1226, client DS 230 transmits the count value to client DSM 210 as a return value of the call to client DS entry 232 at step 1222. At step 1228, client DSM 210 reports the count value as a return value of the call to client DSM entry 212 at step 1220.

At step 1230, scanner redirection module 122 transmits the scanned image and count value to virtual DS 280 via sockets 252 and 254. At step 1232, if the count value is nonzero, which indicates the availability of at least one more scanned image from sheet-fed scanner 262, method 1200 ends. Otherwise, if the count value equals zero, which indicates that there are no more scanned images available from sheet-fed scanner 262, method 1200 moves to step 1234. At step 1234, scanner redirection module 122 calls client DSM entry 212 to request client DSM 210 to disable client DS 230. At step 1236, client DSM 210 calls client DS entry 232 to transmit a request to client DS 230 to disable. At step 1238, client DS 230 disables the transfer of data from sheet-fed scanner 262. After step 1238, method 1200 ends.

Figure 13:
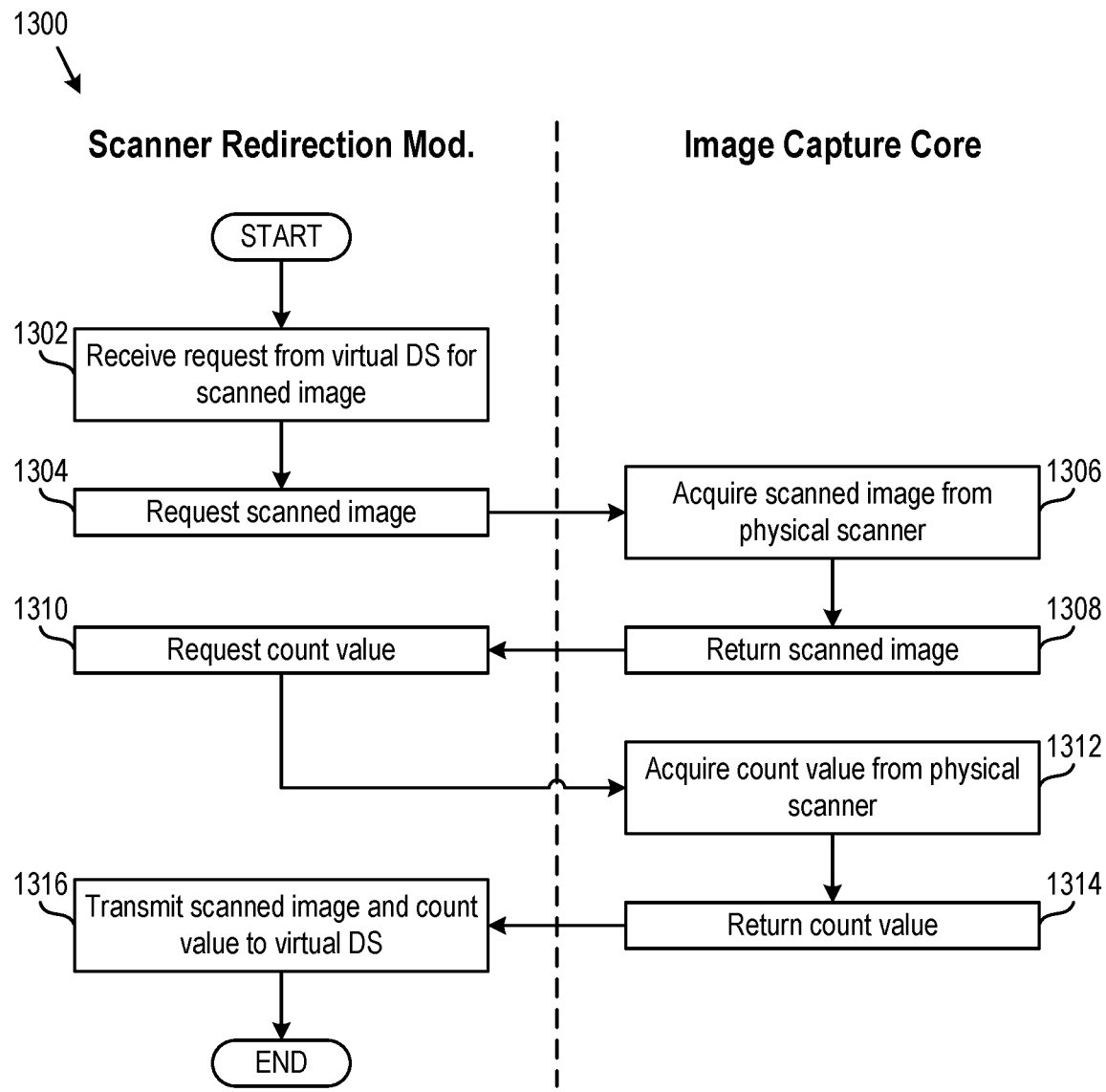
FIG. 13 is a flow diagram of steps performed by the scanner redirection module of the client computing device to carry out a method of acquiring one or more scanned images from the physical scanner, according to the second embodiment.

FIG. 13 is a flow diagram of steps performed by scanner redirection module 122 of client computing device 110 to carry out a method 1300 of acquiring one or more scanned images from a physical scanner, according to the second embodiment. For example, method 1300 will be discussed with respect to sheet-fed scanner 262. At step 1302, scanner redirection module 122 receives a request for a scanned image from virtual DS 280 via sockets 252 and 254. At step 1304, scanner redirection module 122 makes an API call to image capture core 320 to request image capture core 320 for the scanned image. It should be noted that image capture core 320 must open a scanner session with sheet-fed scanner 262 before acquiring scanned images therefrom.

At step 1306, image capture core 320 acquires the scanned image from sheet-fed scanner 262, which is either the default physical scanner or is a physical scanner the user previously designated via scanner module 118, scanner redirection nodule 122 having then received an identification of sheet-fed scanner 262 from RD client 114. At step 1308, image capture core 320 returns the scanned image to scanner redirection module 122. At step 1310, scanner redirection module 122 makes an API call to image capture core 320 to request image capture core 320 for a count value. At step 1312, image capture core 320 acquires the count value from sheet-fed scanner 262. At step 1314, image capture core 320 returns the count value to scanner redirection module 122. At step 1316, scanner redirection module 122 transmits the scanned image and count value to virtual DS 280 via sockets 252 and 254. After step 1316, method 1300 ends. It should be noted that image capture core 320 acquires images from sheet-fed scanner 262 asynchronously. Accordingly, if sheet-fed scanner 262 scans multiple images, image capture core 320 performs steps 1306 and 1308 to acquire and return multiple scanned images asynchronously.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop system that includes a client computing device that has running therein remote desktop software including a scanner redirection module, and a host server, the scanner redirection module including a scanner core that is configured to communicate with a physical scanner, the scanner redirection method comprising:
    transmitting a request to the scanner core for a name of the physical scanner;
    receiving the name of the physical scanner from the scanner core;
    transmitting the received name of the physical scanner to the host server, wherein an application running on the host server displays the name of the physical scanner in a remote desktop image generated at the host server and transmitted to the client computing device; and
    in response to a first user selection to acquire a scanned image and a second user selection of the name of the physical scanner, the first and second user selections being made on a user interface (UI) of the host server, receiving from the application a request for the scanned image, transmitting to the scanner core a request to acquire the scanned image from the physical scanner, and upon receiving the scanned image from the scanner core, transmitting the scanned image to the application.

2. The scanner redirection method of claim 1, wherein the scanner core is a data source, and the scanner redirection module further includes a data source manager for communicating with the data source.

3. The scanner redirection method of claim 2, further comprising:
    transmitting a request to another data source for a name of another physical scanner; and
    in response to a third user selection made on a UI of the client computing device, transmitting the name of the other physical scanner to the host server.

4. The scanner redirection method of claim 1, wherein the scanner core is an image capture core, and the scanner redirection module further includes a conversion module that is configured to convert data between being described according to a first scanning protocol that is used by the scanner redirection module and being described according to a second scanning protocol that is used by the application.

5. The scanner redirection method of claim 4, further comprising:
    transmitting a request to the image capture core for a name of another physical scanner; and
    in response to a third user selection made on a UI of the client computing device, transmitting the name of the other physical scanner to the host server.

6. The scanner redirection method of claim 1, further comprising:
    after the receiving of the scanned image from the scanner core, determining that there are no more scanned images available from the physical scanner; and
    in response to the determining that there are no more scanned images available, transmitting a message to the application indicating that there are no more scanned images available.

7. The scanner redirection method of claim 1, further comprising:
    after the receiving of the scanned image from the scanner core, determining that there is another scanned image available from the physical scanner; and
    in response to the determining that there is another scanned image available, transmitting a message to the application indicating the availability of the other scanned image.

8. A non-transitory computer-readable medium comprising instructions that are executable in a remote desktop system that includes a client computing device that has running therein remote desktop software including a scanner redirection module, and a host server, the scanner redirection module including a scanner core that is configured to communicate with a physical scanner, wherein the instructions when executed cause the remote desktop system to carry out a scanner redirection method comprising:
    transmitting a request to the scanner core for a name of the physical scanner;
    receiving the name of the physical scanner from the scanner core;
    transmitting the received name of the physical scanner to the host server, wherein an application running on the host server displays the name of the physical scanner in a remote desktop image generated at the host server and transmitted to the client computing device; and
    in response to a first user selection to acquire a scanned image and a second user selection of the name of the physical scanner, the first and second user selections being made on a user interface (UI) of the host server, receiving from the application a request for the scanned image, transmitting to the scanner core a request to acquire the scanned image from the physical scanner, and upon receiving the scanned image from the scanner core, transmitting the scanned image to the application.

9. The non-transitory computer-readable medium of claim 8, wherein the scanner core is a data source, and the scanner redirection module further includes a data source manager for communicating with the data source.

10. The non-transitory computer-readable medium of claim 9, the scanner redirection method further comprising:
    transmitting a request to another data source for a name of another physical scanner; and
    in response to a third user selection made on a UI of the client computing device, transmitting the name of the other physical scanner to the host server.

11. The non-transitory computer-readable medium of claim 8, wherein the scanner core is an image capture core, and the scanner redirection module further includes a conversion module that is configured to convert data between being described according to a first scanning protocol that is used by the scanner redirection module and being described according to a second scanning protocol that is used by the application.

12. The non-transitory computer-readable medium of claim 11, the scanner redirection method further comprising:
   transmitting a request to the image capture core for a name of another physical scanner; and
   in response to a third user selection made on a UI of the client computing device, transmitting the name of the other physical scanner to the host server.

13. The non-transitory computer-readable medium of claim 8 the scanner redirection method further comprising:
   after the receiving of the scanned image from the scanner core, determining that there are no more scanned images available from the physical scanner; and
   in response to the determining that there are no more scanned images available, transmitting a message to the application indicating that there are no more scanned images available.

14. The non-transitory computer-readable medium of claim 8, the scanner redirection method further comprising:
   after the receiving of the scanned image from the scanner core, determining that there is another scanned image available from the physical scanner; and
   in response to the determining that there is another scanned image available, transmitting a message to the application indicating the availability of the other scanned image.

15. A computer system comprising:
   a host server; and
   client computing device that has running therein remote desktop software including a scanner redirection module, the scanner redirection module including a scanner core that is configured to communicate with a physical scanner, and the remote desktop software being configured to:
   transmit a request to the scanner core for a name of the physical scanner;
   receive the name of the physical scanner from the scanner core;
   transmit the received name of the physical scanner to the host server, wherein an application running on the host server displays the name of the physical scanner in a remote desktop image generated at the host server and transmitted to the client computing device; and
   in response to a first user selection to acquire a scanned image and a second user selection of the name of the physical scanner, the first and second user selections being made on a user interface (UI) of the host server, receive from the application a request for the scanned image, transmit to the scanner core a request to acquire the scanned image from the physical scanner, and upon receiving the scanned image from the scanner core, transmit the scanned image to the application.

16. The computer system of claim 15, wherein the scanner core is a data source, and the scanner redirection module further includes a data source manager for communicating with the data source.

17. The computer system of claim 16, wherein the remote desktop software is further configured to:
   transmit a request to another data source for a name of another physical scanner; and
   in response to a third user selection made on a UI of the client computing device, transmit the name of the other physical scanner to the host server.

18. The computer system of claim 15, wherein the scanner core is an image capture core, and the scanner redirection module further includes a conversion module that is configured to convert data between being described according to a first scanning protocol that is used by the scanner redirection module and being described according to a second scanning protocol that is used by the application.

19. The computer system of claim 18, wherein the remote desktop software is further configured to:
   transmit a request to the image capture core for a name of another physical scanner; and
   in response to a third user selection made on a UI of the client computing device, transmit the name of the other physical scanner to the host server.

20. The computer system of claim 15, wherein the remote desktop software is further configured to:
   after the receiving of the scanned image from the scanner core, determine that there are no more scanned images available from the physical scanner; and
   in response to the determining that there are no more scanned images available, transmit a message to the application indicating that there are no more scanned images available.

\* \* \* \* \*